United States Patent
Ebersole et al.

(10) Patent No.: US 10,376,059 B1
(45) Date of Patent: Aug. 13, 2019

(54) SUPPORT ASSEMBLY FOR WIRE SHELF AND METHOD OF USE

(71) Applicant: The Invention Club, LLC, Mechanicsburg, PA (US)

(72) Inventors: Jonathan Scott Ebersole, Mechanicsburg, PA (US); Debra Michelle Lohman, Mechanicsburg, PA (US)

(73) Assignee: The Invention Club, LLC, Mechanicsburg, PA (US)

( * ) Notice: Subject to any disclaimer, the term of this patent is extended or adjusted under 35 U.S.C. 154(b) by 0 days.

(21) Appl. No.: 16/248,311

(22) Filed: Jan. 15, 2019

(51) Int. Cl.
*A47B 96/06* (2006.01)
*F16B 2/04* (2006.01)
*A47B 96/02* (2006.01)

(52) U.S. Cl.
CPC ............ *A47B 96/06* (2013.01); *A47B 96/021* (2013.01); *F16B 2/04* (2013.01)

(58) Field of Classification Search
CPC ... A47B 61/003; A47B 57/581; A47F 5/0846; A47F 5/0006; A47F 5/083; F16B 2/04
See application file for complete search history.

(56) References Cited

U.S. PATENT DOCUMENTS

| | | | |
|---|---|---|---|
| 745,503 A | 3/1904 | Rubicam et al. | |
| 1,371,619 A | 3/1921 | Greenstreet | |
| 2,229,935 A | 1/1941 | Powers | |
| 4,244,544 A | 1/1981 | Kornat | |
| 4,340,144 A | 7/1982 | Cousins | |
| 4,607,753 A * | 8/1986 | Radek | A47F 5/0846 211/189 |
| 4,678,151 A * | 7/1987 | Radek | A47F 5/0846 211/59.1 |
| 4,722,648 A | 2/1988 | Camilleri | |
| 4,726,554 A * | 2/1988 | Sorrell | A47F 5/0846 211/106.01 |
| 4,826,120 A | 5/1989 | Newton et al. | |
| 5,316,246 A | 5/1994 | Scott et al. | |
| D352,195 S | 11/1994 | Rogers et al. | |
| D354,864 S | 1/1995 | Kokenge et al. | |
| 5,405,026 A | 4/1995 | Lee et al. | |
| 5,437,380 A | 8/1995 | Peay et al. | |
| D372,188 S | 7/1996 | Van Dyke | |
| 5,531,416 A | 7/1996 | Remmers | |
| 5,580,018 A | 12/1996 | Remmers | |
| 5,582,377 A * | 12/1996 | Quesada | A47F 5/083 24/343 |
| 5,758,851 A | 6/1998 | Remmers | |
| 5,910,351 A | 6/1999 | Davis et al. | |
| 5,954,301 A | 9/1999 | Joseph et al. | |
| D419,344 S | 1/2000 | Greene | |
| 6,024,333 A | 2/2000 | Raasch et al. | |
| 6,189,847 B1 | 2/2001 | Hart | |
| 6,206,330 B1 | 3/2001 | Oi et al. | |
| 6,364,266 B1 | 4/2002 | Garvin | |

(Continued)

*Primary Examiner* — Bradley Duckworth
(74) *Attorney, Agent, or Firm* — Hooker & Habib, P.C.

(57) ABSTRACT

A support adapted for mounting to wire shelving units, particularly a support adapted to be securely coupled and repositioned on upper and lower horizontally-extending wire members located at the front of wire shelving units. The support does not interfere with use of a shelving unit including the storage of items on the shelving unit or handing items under the shelving unit.

29 Claims, 8 Drawing Sheets

(56) References Cited

U.S. PATENT DOCUMENTS

| | | |
|---|---|---|
| 6,460,710 B1 | 10/2002 | Dardashti |
| 6,575,315 B2 | 6/2003 | Zidek |
| D488,054 S | 4/2004 | Myers |
| 6,969,036 B2 | 11/2005 | Magnusson |
| 7,004,335 B2 | 2/2006 | Remmers |
| D527,559 S | 9/2006 | Remmers |
| 7,175,143 B1 | 2/2007 | Ho |
| 7,185,772 B2 | 3/2007 | Remmers |
| D568,254 S | 5/2008 | Patchett et al. |
| D569,234 S | 5/2008 | Young, IV |
| D569,236 S | 5/2008 | Young, IV |
| D569,712 S | 5/2008 | Young, IV |
| D569,715 S | 5/2008 | Fernandez |
| D589,899 S | 4/2009 | Huang et al. |
| 7,516,930 B2 | 4/2009 | Chen |
| D596,128 S | 7/2009 | Hung et al. |
| D617,741 S | 6/2010 | Fennell |
| 7,726,619 B2 | 6/2010 | Lien |
| D621,244 S | 8/2010 | Kundinger, Jr. et al. |
| 7,810,440 B2 | 10/2010 | Ward |
| 7,825,337 B2 | 11/2010 | Young, IV |
| 7,900,783 B2 | 3/2011 | Fernandez et al. |
| D638,690 S | 5/2011 | Hoek |
| D638,691 S | 5/2011 | Hoek |
| D638,692 S | 5/2011 | Hoek |
| 7,946,549 B2 | 5/2011 | Forrest et al. |
| 7,950,537 B1 | 5/2011 | Goodman et al. |
| D639,145 S | 6/2011 | Hoek |
| D639,146 S | 6/2011 | Hoek |
| D640,527 S | 6/2011 | Hoek |
| D644,501 S | 9/2011 | Chen |
| D657,869 S | 4/2012 | Mammen |
| 8,152,005 B2 | 4/2012 | Barkdoll et al. |
| D668,620 S | 10/2012 | Convert et al. |
| 8,308,116 B2 | 11/2012 | Daniels |
| D680,851 S | 4/2013 | Lo |
| 8,453,984 B2 | 6/2013 | Best et al. |
| 8,579,121 B2 | 11/2013 | Egn et al. |
| 8,646,624 B2 | 2/2014 | Fernandez et al. |
| 8,998,151 B2 | 4/2015 | Hoek |
| 9,027,767 B2 | 5/2015 | Buckley et al. |
| 9,049,931 B2 | 6/2015 | Brinton, Jr. et al. |
| 9,149,119 B2 | 10/2015 | Hansel et al. |
| D742,212 S | 11/2015 | Hsu |
| D743,048 S | 11/2015 | Kuran |
| D749,209 S | 2/2016 | Uhlenkamp et al. |
| 9,345,343 B2 | 5/2016 | Sobb |
| D767,500 S | 9/2016 | Byrne et al. |
| D768,089 S | 10/2016 | Liu |
| D773,414 S | 12/2016 | Hoffman |
| D774,002 S | 12/2016 | Hsieh |
| 9,618,143 B2 | 4/2017 | Noble |
| D790,127 S | 6/2017 | Verleur |
| 9,700,137 B2 | 7/2017 | Davis |
| 9,706,859 B2 | 7/2017 | Brinton, Jr. et al. |
| D799,941 S | 10/2017 | Rothenberg et al. |
| D802,168 S | 11/2017 | Lee |
| D803,164 S | 11/2017 | Noble |
| D805,879 S | 12/2017 | Garcia |
| D822,122 S | 7/2018 | Bilezikian et al. |
| D822,463 S | 7/2018 | Han |
| 10,021,975 B1 * | 7/2018 | Womble .................. A47B 61/02 |
| D832,682 S | 11/2018 | Ebersole |
| 2004/0118982 A1 | 6/2004 | Shillings et al. |
| 2005/0189453 A1 | 9/2005 | DeGuevara |
| 2005/0230577 A1 | 10/2005 | Chen |
| 2006/0011570 A1 | 1/2006 | Chen |
| 2006/0124811 A1 | 6/2006 | Tatarsky et al. |
| 2006/0231516 A1 | 10/2006 | Moore |
| 2006/0261230 A1 * | 11/2006 | Lee ....................... A47B 61/003<br>248/304 |
| 2007/0012832 A1 * | 1/2007 | Ottens .................. A47F 5/0823<br>248/220.41 |
| 2007/0235597 A1 | 10/2007 | Winchester |
| 2009/0152424 A1 | 6/2009 | Forrest et al. |
| 2012/0068032 A1 | 3/2012 | Stockman |
| 2015/0053632 A1 | 2/2015 | Brinton, Jr. et al. |
| 2015/0265069 A1 | 9/2015 | Brinton, Jr. et al. |
| 2016/0320034 A1 | 11/2016 | Wessel |
| 2017/0367481 A1 | 12/2017 | Ebersole |
| 2018/0080485 A1 * | 3/2018 | Wang ........................ F16B 2/04 |
| 2018/0228303 A1 | 8/2018 | Wills et al. |

* cited by examiner

SUPPORT ASSEMBLY FOR WIRE SHELF AND METHOD OF USE

FIELD OF THE DISCLOSURE

The disclosure relates to supports mounted onto wire shelving units, particularly supports having hooks or like engagement features to secure items in place. The disclosed support assembly is adapted to securely and releasably couple to wire members at the front of wire shelving units so that the support assembly does not interfere with use of the shelving unit.

BACKGROUND OF THE DISCLOSURE

Wire shelving units are commonly mounted in closets, wardrobes, workspaces and other locations to provide additional storage options. The units are typically constructed of elongate wire members of stainless steel or a like material that is powder coated, painted or has a like surface finish.

The wire shelving units typically include an upper, planar shelving area made up of a number of wire members and at least two horizontally-oriented wire members that extend along the front portion of the shelving area.

It is known to mount garment hangers, brackets, S-hooks and like accessories to wire shelving units to provide additional storage options. These accessories can interfere with shelving unit use as accessory elements extend into the top shelving area of the unit through gaps between wire members or impede access to the front of the shelving area. Existing accessories have multiple-element structures and separate fasteners that require separate fastener tools. This complicates installation and removal of the accessories from a shelving unit. S-hooks used with wire shelving units freely hang from lower unit wire elements. S-hooks rely on gravity to keep them in place and are not otherwise secured to the shelving units. This can result in S-hooks and hung items being inadvertently dislodged and falling from shelving units when a user adds or removes items therefrom.

Thus, there is a need for an improved support adapted for mounting to a wire shelving unit that does not interfere with shelving unit use, may be easily mounted and secured to a shelving unit without the need of additional tools and is simple to manufacture.

SUMMARY OF THE DISCLOSURE

Disclosed is a support assembly and its method of use. The support assembly is adapted to be mounted on the front of wire shelving units.

The support assembly includes a spring-actuated telescoping column that facilitates engagement with upper and lower shelf wire members. The assembly may be installed and removed from a wire shelving unit by-hand without the need of additional tools. The assembly does not extend into the top shelving area of a shelving unit or impede access to the front of the shelving area.

The disclosed assembly is capable of supporting objects having weights many times that of the assembly. An assembly weighing a fraction of one pound is capable of supporting objects weighing up to approximately 80 pounds in weight without assembly failure.

Other objects and features of the disclosure will become apparent as the description proceeds, especially when taken in conjunction with the accompanying drawing sheets illustrating the support.

DETAILED DESCRIPTION OF THE INVENTION

Figure 1:
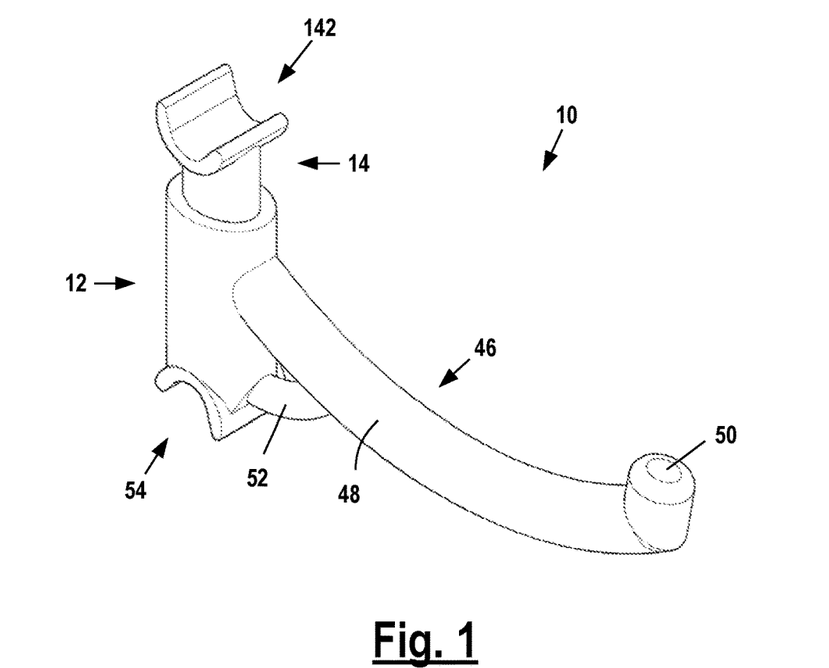
FIG. 1 is a perspective view of a support assembly in a non-compressed configuration.
Figure 2:
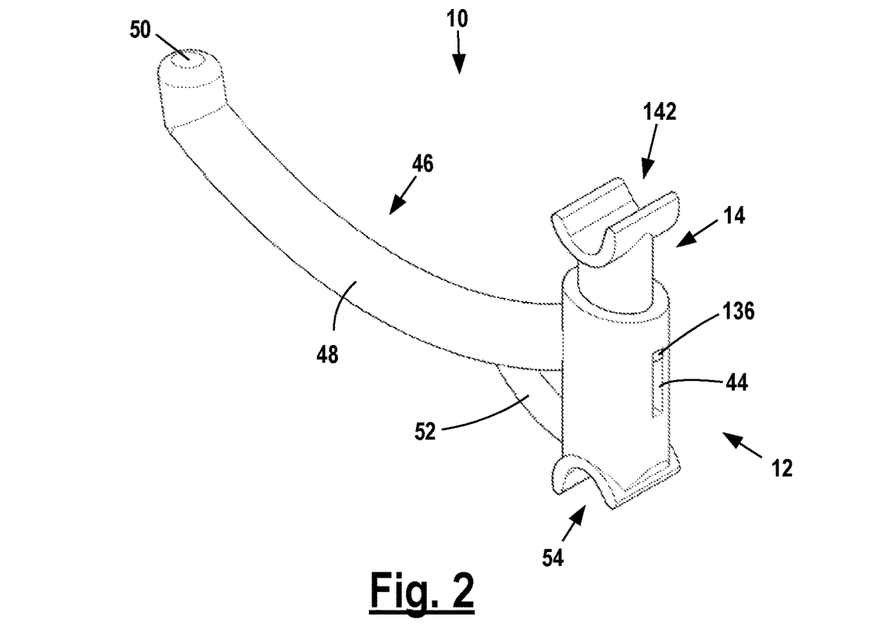
FIG. 2 is an alternate perspective view of the assembly in a non-compressed configuration.
Figure 3:
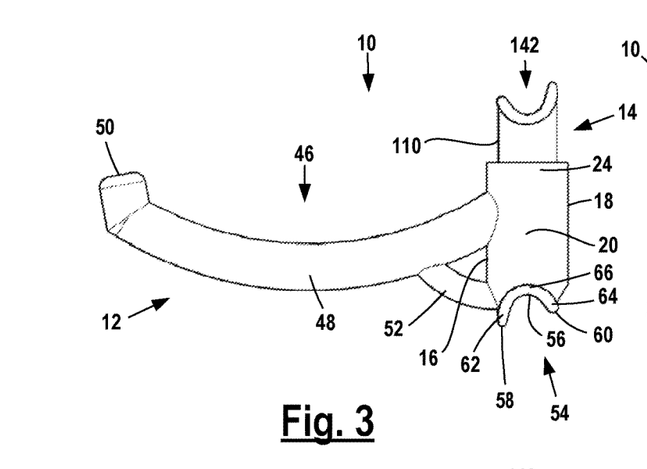
FIG. 3 is a side view of the assembly in a non-compressed configuration.
Figure 4:
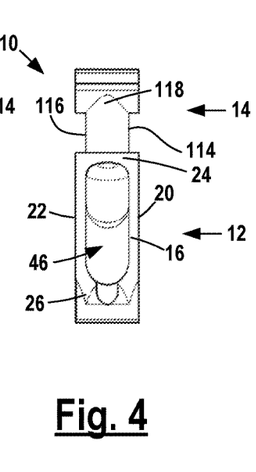
FIG. 4 is a front view of the assembly in a non-compressed configuration.
Figure 5:
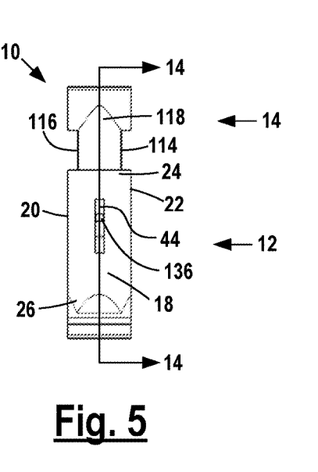
FIG. 5 is a rear view of the assembly in a non-compressed configuration.
Figure 6:
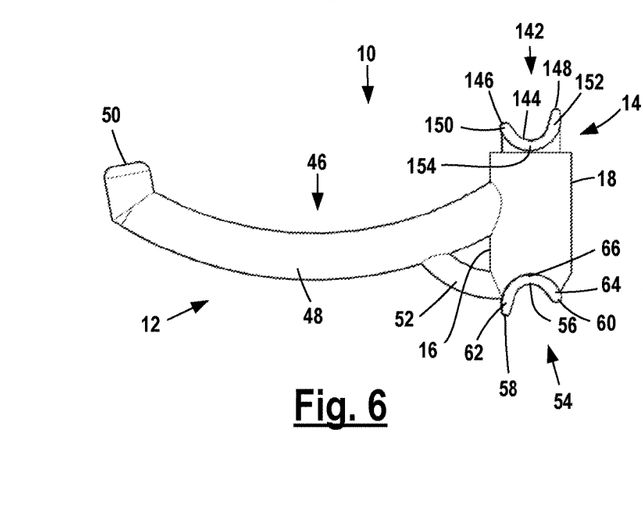
FIG. 6 is a side view of the assembly in a fully compressed configuration.
Figure 7:
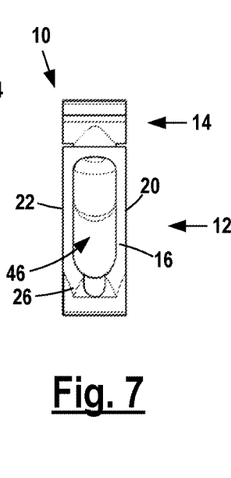
FIG. 7 is a front view of the assembly in a fully compressed configuration.
Figure 8:
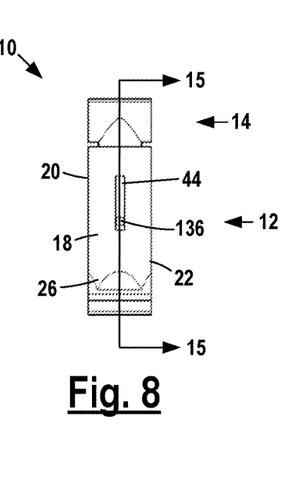
FIG. 8 is a rear view of the assembly in a fully compressed configuration.

FIG. 1 is a perspective view of a first embodiment support assembly 10.

Assembly 10 is made up of first and second body elements 12 and 14.

Body elements 12 and 14 may be formed from a rigid material, including plastics, metals or the like. In certain embodiments, elements 12 and 14 may be plastic elements formed by known injection molding techniques, or elements formed from thermoplastic polymers or polycarbonate material.

Body element 12 has front portion 16, rear portion 18, side portions 20, 22, top portion 24 and bottom portion 26.

A generally uniform first body wall 28 surrounds and defines body cavity 30 within body element 12. Cavity 30 extends from cavity opening 32 at the top 24 of body 12 to cavity floor 34. Cavity 30 may have a generally uniformly cylindrical shape and extend generally vertically along a first body cavity axis 36.

In embodiments, body cavity 30 may be generally oval-shaped so that cavity opening 32 is generally likewise oval-shaped with a major axis 38 extending between body front 16 and body rear 18. See FIG. 10.

Cavity 30 body wall 28 has an internal cavity surface 40.

Cavity floor 34 may include a retention bore 42. In embodiments, retention bore 42 may be generally cylindrical in shape.

In embodiments cavity floor 34 may be angled and slope upward from body front 16 to body rear 18. See FIG. 11.

Body element 12 may include a retention slot 44 extending generally vertically along body 12 and through first body wall 28. Retention slot 44 may be continuous with body cavity 30 as illustrated in the present figures. In alternate embodiments, retention slot 44 may extend from body cavity 30 partially into first body wall 28.

Figure 25:
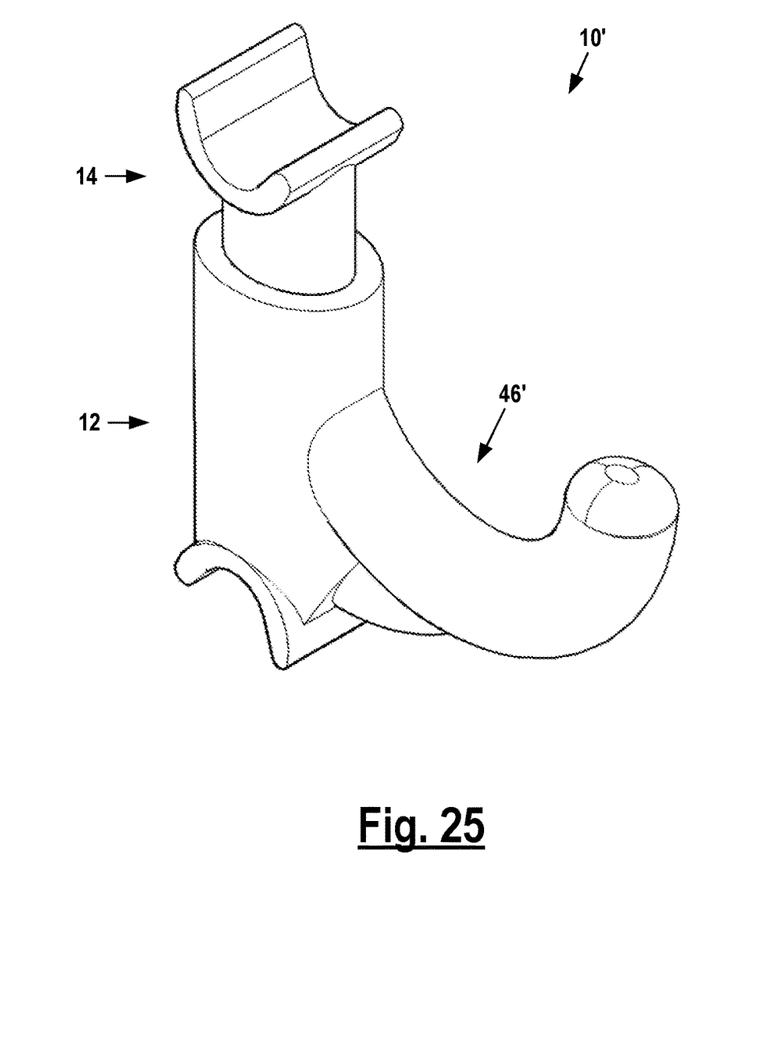
FIG. 25 is a perspective view of an alternate embodiment support assembly.

Body element 12 may include an engagement hook 46 extending away from body front 16 along hook arm 48 to hook end 54. Engagement hook 46 may include a support strut 52 extending away from body front and engaging hook arm 48 to provide additional load support capacity. In alternate embodiments, engagement hook 46 may have different shapes, including longer, shorter or differently shaped hook arms 48. For instance, see alternate embodiment engagement hook 46' shown on alternate embodiment support assembly 10' shown in FIG. 25.

Body 12 includes engagement mouth 54 located at body bottom 26. Mouth 54 includes wire engagement surface 56 which extends generally between mouth front edge 58 and mouth rear edge 60. Edges 58 and 60 are located proximate mouth front wall 62 and mouth rear wall 64 respectively, walls 62 and 64 extending downwardly and away from body 12 and body bottom 26.

Wire engagement surface 56 is concave having a generally smooth, curved surface. In embodiments wire engagement surface 56 may be parabolic in shape. A parabolic-shaped engagement surface 56 allows engagement mouth 54 to engage wire shelving units having wire members of different sized diameters.

Mouth walls 62 and 64 may extend different distances away from body 12 and mouth base 66. For example, in embodiments, mouth front wall 62 may extend a distance 68 away from the mouth base 66, and mouth rear wall 68 may extend a distance 70 from mouth base 66, distance 68 greater than distance 70. In such embodiments, mouth front edge 58 is likewise located a greater distance from mouth base 66 than mouth rear edge 60. See FIG. 11.

Body element 14 has front portion 110, rear portion 112, side portions 114, 116, top portion 118 and bottom portion 120.

Body element 14 has a body column 122 that extends between the top 118 of body 14 to the bottom 120 of body 14. Column 122 may have a generally uniformly cylindrical shape and extend generally vertically along a center axis 124 ending at a column bottom or end surface 126 proximate bottom 120.

In embodiments, body column 122 may be generally oval-shaped, with a major axis 128 extending generally between body front 110 and body rear 112. See FIG. 13.

Column bottom surface 126 may include a retention bore 130. In embodiments, retention bore 130 may be generally cylindrical in shape.

Column bottom surface 126 may be angled and slope upward from body front 110 and body rear 112. See FIG. 12. In embodiments the upward slope of column bottom surface 126 may be generally similar to the upward slope of cavity floor 34.

Body element 14 may include a retention flange 136 extending away from body column 122.

Flange 136 is adapted to fit within and slide along retention slot 44 in assembly 10. Flange 136 may include a top surface 138 to engage the top of slot 44 and an angled bottom surface 140. When assembled, flange outer surface 144 may be generally flush with the outer surface of first body 12 wall 28.

Body 14 includes engagement mouth 142 located at body top 118. Mouth 142 is generally similar in structure to mouth 54 described herein, but for having a generally mirror-image configuration as shown in the figures and described below.

Mouth 142 includes wire engagement surface 144 which extends generally between mouth front edge 146 and mouth rear edge 148. Edges 146 and 148 are located proximate mouth front wall 150 and mouth rear wall 152 respectively, walls 150 and 152 extending upwardly and away from body 14 and body top 118.

Wire engagement surface 144 is concave having a generally smooth, curved surface. In embodiments wire engagement surface 144 may be parabolic in shape, like above disclosed wire engagement surface 56. A parabolic-shaped engagement surface 144 allows engagement mouth 142 to engage wire shelving units having wire members of different sized diameters.

In embodiments, surfaces 144 and 56 may be generally identical to one another.

Mouth walls 150 and 152 may extend different distances away from body 14 and mouth base 154. For example, in embodiments, mouth front wall 150 may extend a distance 156 away from mouth base 154, and mouth rear wall 152 may extend a distance 158 from mouth base 154, distance 158 greater than distance 156. In such embodiments, mouth rear edge 148 is likewise located a greater distance from mouth base 154 than mouth front edge 146. See FIG. 12.

In alternate embodiments, second body element 14 may include an engagement hook (not illustrated) extending away from body front 16 and generally similar to engagement hook 50.

Spring assembly 200 is located between first body element 12 and second body element 14.

Spring assembly 200 is substantially made up of a spring 202. Spring 202 may be a conventional coil or helical compression spring having first and second spring ends 204, 206.

Spring assembly 200 engages first body element 12 and second body element 14 in assembly 10 as explained below.

Assembly 10 is assembled by fitting second body element 14 body column 122 into first body element 12 body cavity 30 so that retention flange 136 fits into retention slot 44. During initial insertion, body element 12 may be deformed to fit column 122 and flange 136 within cavity 30. Once column 122 is placed within retention slot 44 it is secured from disassembly by flange 136 being constrained along slot 44.

Body column 122 is sized to fit body cavity 30 to allow a sliding connection between first body element 12 and second body element 14. The sliding connection has a close sliding fit tolerance between column 122 and cavity 30 internal cavity surface 40. The close sliding fit tolerance allows smooth vertical movement of column 122 relative to cavity 30 while maintaining substantially full contact between column 122 and surface 40.

Figures 9, 10, 11, 12, 13:
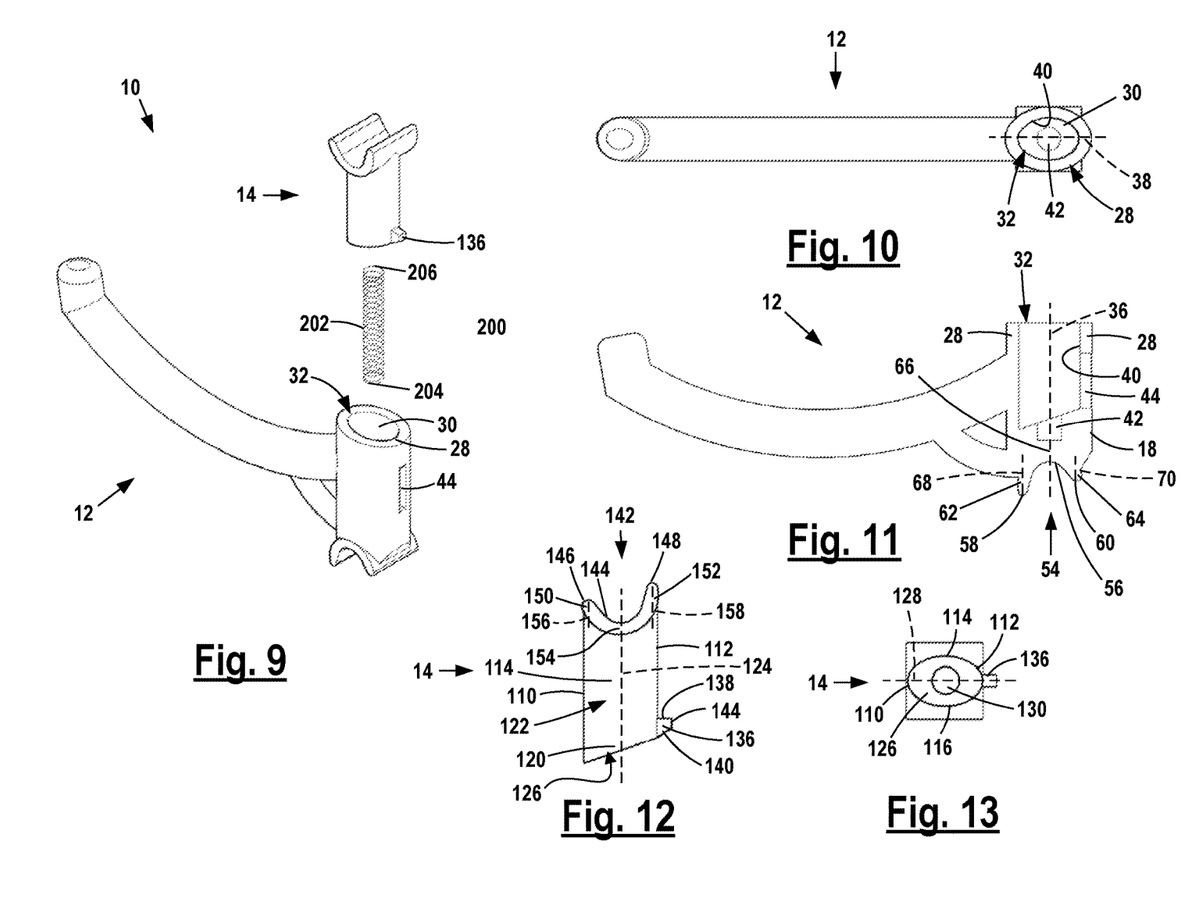
FIG. 9 is a perspective exploded view of the assembly.
FIG. 10 is a top view of an assembly first body element.
FIG. 11 is a sectional side view of an assembly first body element.
FIG. 12 is a side view of an assembly second body element.
FIG. 13 is a bottom view of an assembly second body element.
Figure 14:
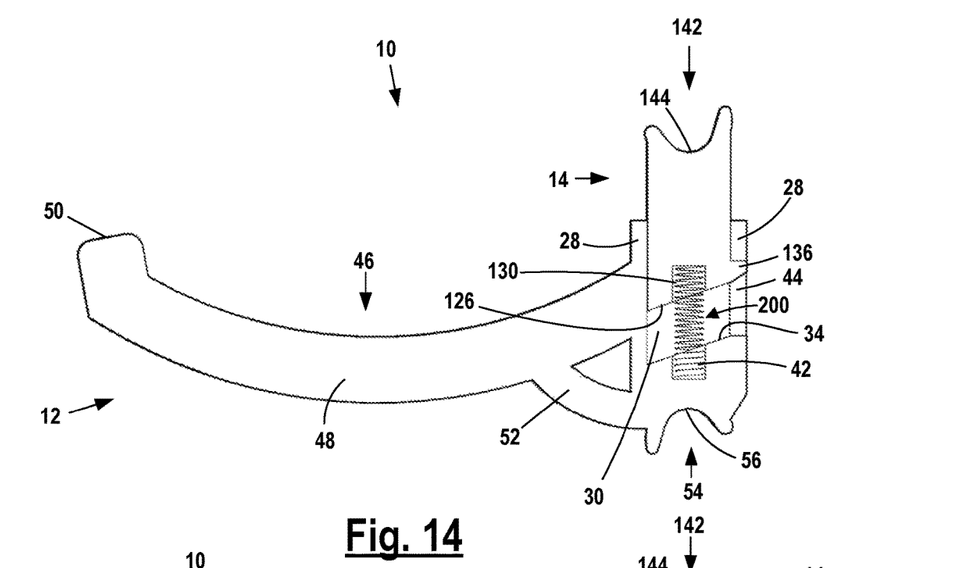
FIG. 14 is a sectional side view of the assembly taken along line 14-14 of FIG. 5.
Figure 15:
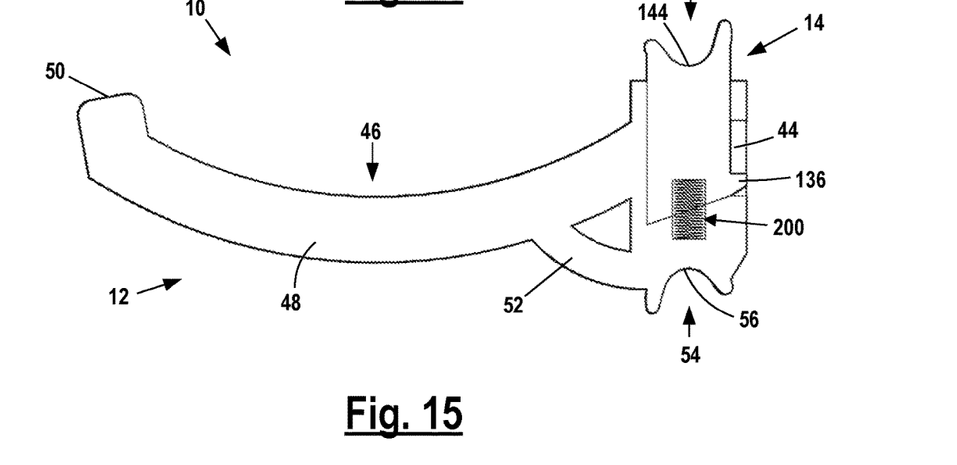
FIG. 15 is a sectional side view of the assembly taken along line 15-15 of FIG. 8.

Spring assembly 200 is placed between first body element 12 and second body element 14 before assembly as shown generally in exploded view FIG. 9. First spring end 204 may engage first body retention bore 42. Second spring end 206 may engage second body retention bore 130. Spring ends 204, 206 may be secured within retention bores 42, 130 by interference fits.

Figure 16:
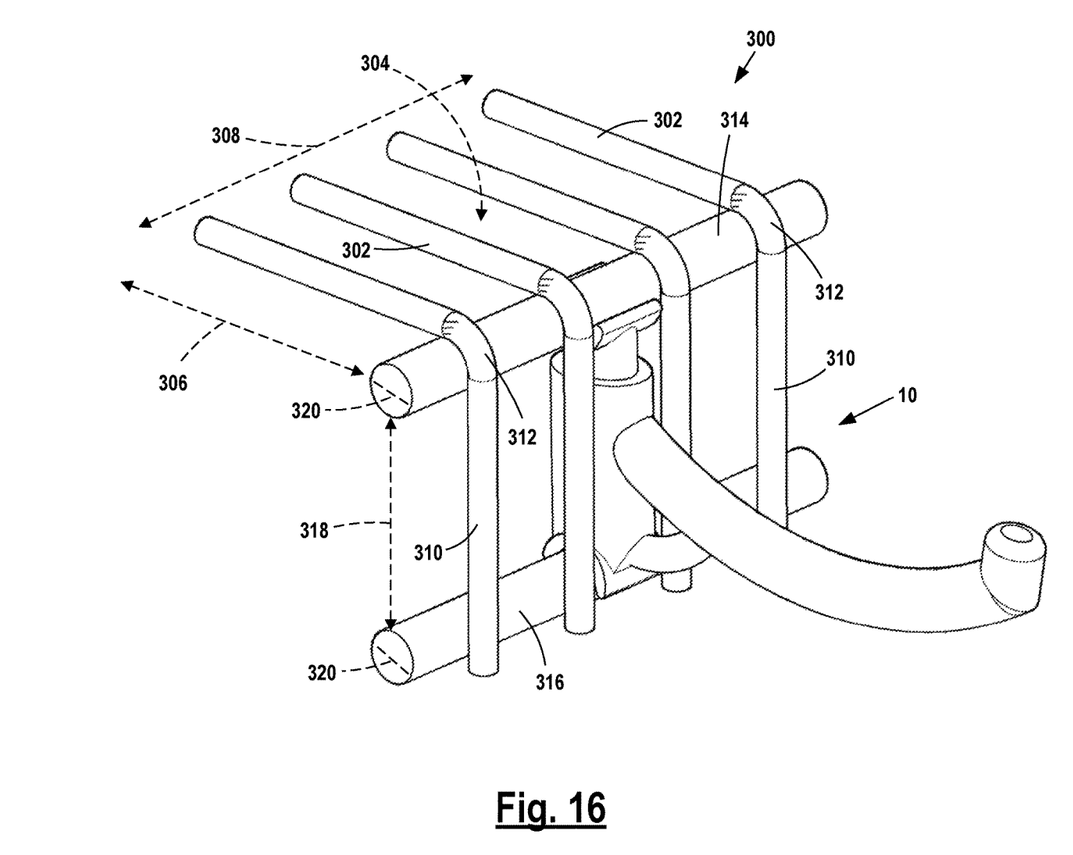
FIG. 16 is a perspective view of the assembly installed on a wire shelving unit in a partially-compressed configuration.
Figure 17:
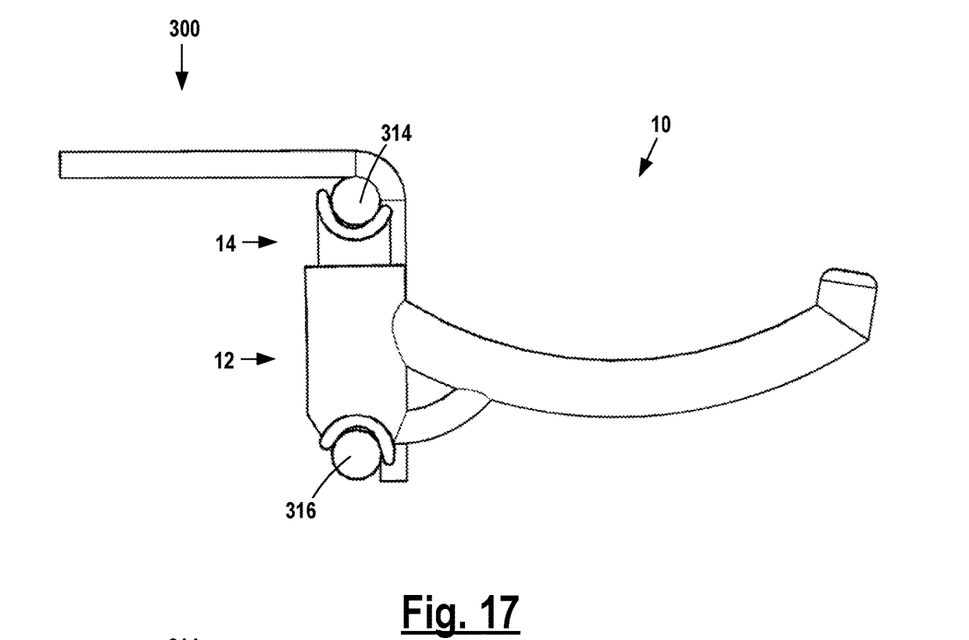
FIG. 17 is a side view of the assembly installed on a wire shelving unit in a partially-compressed configuration.
Figure 18:
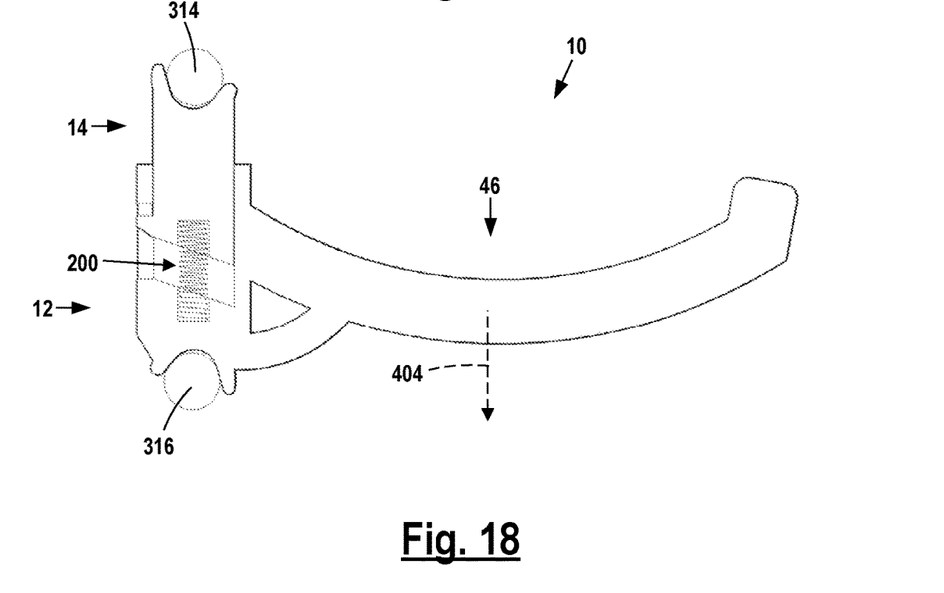
FIG. 18 is a sectional side view of the assembly installed on a wire shelving unit in a partially-compressed configuration.

Assembly 10 has non-compressed configurations as shown in FIGS. 1-5 and 14, fully compressed configurations as shown in FIGS. 6-8 and 15 and partially-compressed configurations as shown in FIGS. 16-18.

In a non-compressed configuration, largely uncompressed spring assembly 200 exerts opposed forces on first and second body elements 12 and 14 to bias or force elements 12 and 14 away from each other. As elements 12 and 14 are biased or forced away from each other, engagement mouths 54, 142 are likewise biased or forced away from each other. In a completely non-compressed configuration, flange 136 is located at the top of retention slot 44.

A compression force may be applied to first and second body elements 12 and 14 to compress spring assembly 200 move elements 12 and 14 toward each other. As a compression force is applied and elements 12 and 14 move toward each other, flange 136 likewise moves away from the top of retention slot 44. See FIG. 15.

Use of assembly 10 will now be described.

FIGS. 16 and 17 illustrate assembly 10 installed on a wire shelving unit 300. Unit 300 is made up of a number of wire elements 302 making up a shelving area 304 located in a plane extending between a shelf width 306 and a shelf length 308. Wire elements 302 extend vertically downward from shelving area 304 to form a number of supports 310 located at the front portion 312 of shelving area 304. Supports 310 are joined to horizontally-extending upper and lower wire members 314, 316. Members 314, 316 extend generally parallel to shelf length 308 and to each other along unit front of 312. Members 314, 316 are located a vertically-extending wire member distance 318 from each other. Upper and lower wire members 314, 316 have generally similar, circular cross sectional areas with like diameters 320.

In certain embodiments, the size of upper and lower wire members 314, 316 may be different, having dissimilar circular cross sectional areas and diameters.

As best seen in FIG. 17, when support 10 is installed on a wire shelving unit 300, the support does not contact or interfere with use of shelving area 304. Likewise, hook 46 does not interfere with items located below unit 300 and lower wire member 316.

FIGS. 19 through 24 illustrate the process of installing support 10 onto the upper and lower wire members 314, 316 of a wire shelving unit 300.

Figure 19:
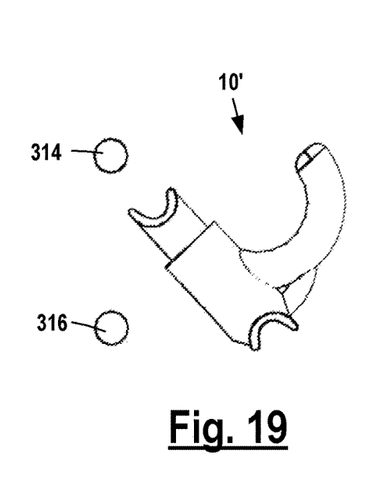
FIGS. 19 through 24 are representational side views showing the process of installing the assembly onto a wire shelving unit.

FIG. 19 shows a fully uncompressed assembly 10' located adjacent unit 300 so that engagement mouth 142 is located proximate upper wire member 314.

Figure 20:
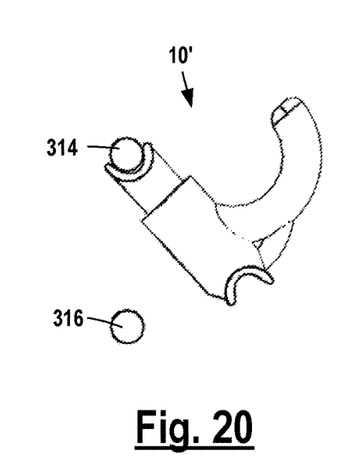

FIG. 20 shows upper engagement mouth 142 placed into engagement with upper wire member 314 to that upper mouth surface 144 contacts member 314.

Figure 21:
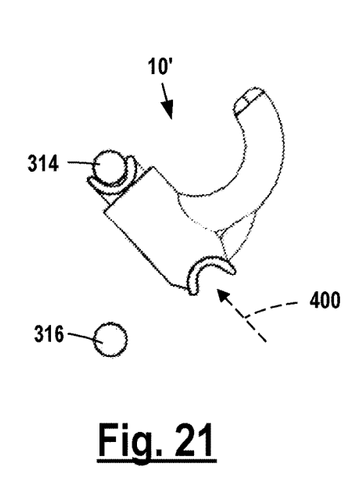
Figure 22:
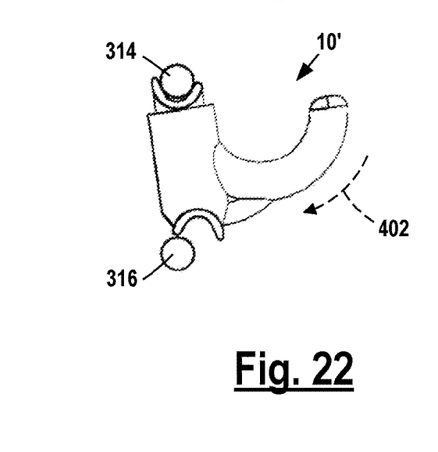
Figure 23:
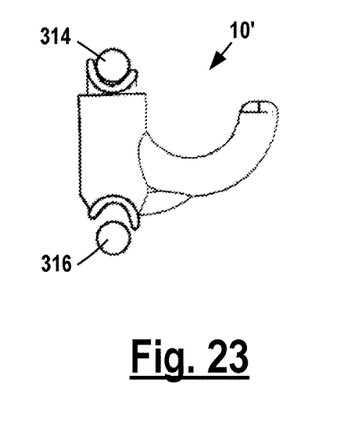
Figure 24:
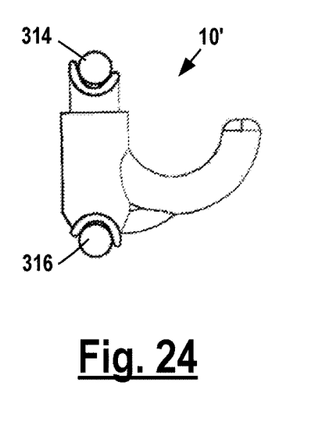

FIG. 21 shows a compression force exerted onto assembly 10' body element 12 toward body element 14 in the direction of arrow 400. As element 14 is restricted from movement by wire member 314, the compression force acts to compress spring assembly 200 and move body element 12 toward body element 14 and likewise move assembly 10' into a compressed configuration.

Assembly 10' is then rotated in the direction of arrow 402 so that engagement mouth 54 is positioned proximate and over lower wire member 316. See FIGS. 22 and 23.

The compression force is then released so that body elements 12 and 14 are biased away from each other by spring assembly 200 and engagement mouth 54 engages lower wire member 316 so that mouth surface 56 contacts member 316. In engagement with wire shelving unit 300, assembly 10' is moved into a partially-compressed configuration. See FIGS. 24 and 18.

Assembly 10' is uninstalled from wire shelving unit 300 by reversing the above steps.

Elements of assembly 10 assist in its ability to bear weight loads. As illustrated in FIG. 18, as a load is placed on engagement hook 46, a downward force 404 is likewise applied to the assembly. Force 404 translates load forces to first and second body elements 12 and 14. These load forces translate generally from the front and rear of the assembly between the major axis 128 extending through of body column 122 and the major axis 38 extending through first body wall 28 of body cavity 30. The load is translated to shelving unit 300 wire members 314, 316 at engagement mouths 54, 142.

First and second mouth walls 62, 64, 150 and 152 secure assembly 10 in place. The parabolic shape of engagement surfaces 56, 144 help assure firm contact between the engagement mouths 54, 142 and wire members 314, 316.

Assembly 10 may be installed and uninstalled from appropriately sized wire shelving units 300 multiple times without the need of additional parts or the use of tools.

Assembly 10 can be adapted to fit different shelving units 300 having different distances 318 between wire members 314 and 316. Likewise, assembly 10 can be adapted to fit different shelving units 300 having wire members 314 and 316 having various circular cross sectional areas of different sizes and different diameters 320.

While one or more embodiments of the assembly have been disclosed and described in detail, it is understood that this is capable of modification and that the scope of the disclosure is not limited to the precise details set forth but includes modifications obvious to a person of ordinary skill in possession of this disclosure and also such changes and alterations as fall within the purview of the following claims.

The invention claimed is:

1. A support assembly for a wire shelf, the support assembly comprising:
   a first body having a body front, a body rear, a body top and a body bottom, the first body having a body cavity and an engagement mouth proximate the body bottom; the body cavity having a generally oval-shaped cross-section and extending from a cavity opening proximate the body top portion to a cavity floor away from the cavity opening, the engagement mouth having a first wire engagement surface, a mouth front edge and a mouth rear edge, said mouth front edge and mouth rear edge extending away from a mouth base, said rear edge proximate said body rear and said front edge proximate said body front, the first wire engagement surface extending between said front edge and rear edge;
   a second body having a body front, a body rear, a body top and a body bottom, the second body having a body column extending from the body bottom toward the body top, the body column having a generally oval-shaped cross-section and a column end surface proximate the body bottom and an engagement mouth proximate the body top, the engagement mouth having a second wire engagement surface, a mouth front edge and a mouth rear edge, said mouth front edge and mouth rear edge extending away from a mouth base, said rear edge proximate said body rear and said front edge proximate said body front, the second wire engagement surface extending between said front edge and rear edge;

one of the first or second body comprising an engagement hook;
said first body engagement mouth facing away from said second body engagement mouth;
a spring assembly located between the first body and the second body, said spring assembly having opposed first and second spring ends, the first spring end engaging the first body proximate the cavity floor, the second spring end engaging the second body proximate the second body bottom, the second body column located within the first body cavity, the assembly having a non-compressed configuration wherein the first body is biased away from the second body by the spring assembly and the assembly having a compressed configuration wherein a compression force compresses the spring assembly and the first body is biased toward the second body.

2. The assembly of claim 1 wherein the first and second wire engagement surfaces are smooth, curved surfaces.

3. The assembly of claim 2 wherein the first and second wire engagement surfaces are generally parabolic.

4. The assembly of claim 3 wherein said first body mouth front edge extends a first distance away from said first body mouth base and said first body mouth rear edge extends a second distance away from said first body mouth base, said first distance not equal to said second distance.

5. The assembly of claim 3 wherein said second body mouth front edge extends a first distance away from said first body mouth base and said second body mouth rear edge extends a second distance away from said first body mouth base, said first distance not equal to said second distance.

6. The assembly of claim 1 wherein the first body comprises a retention slot extending generally vertically between said body top and body bottom and the second body comprises a retention flange said flange located in said retention slot.

7. The assembly of claim 6 wherein said first body retention slot is in communication with said first body cavity.

8. The assembly of claim 1 wherein the first body cavity floor comprises a first body retention bore, said first spring end engaging said first body retention bore and the second body column end surface comprises a second body retention bore, said second spring end engaging said second body retention bore.

9. The assembly of claim 1 wherein the first body cavity floor slopes upward at an angle upward between the first body front and the first body rear and the column end surface slopes upward at an angle upward between the second body front and the second body rear.

10. The assembly of claim 1 wherein said body cavity oval-shaped cross-section and body column oval-shaped cross-section each have a major axis.

11. A support assembly for a wire shelf, the support assembly comprising:
a first body, a second body and a spring assembly;
the first body having an engagement mouth on one side of the first body, the engagement mouth comprising a first wire engagement surface and a cavity opening on the other side of the first body, a cavity having a generally oval-shaped cross-section and extending from the cavity opening to a cavity floor within the cavity and away from the cavity opening;
the second body having an engagement mouth on one side of the second body, the engagement mouth comprising a second wire engagement surface and a body column having a generally oval-shaped cross-section and extending from the second body engagement mouth to a column end surface on the other side of the second body, the body column located within the first body cavity, the second body engagement mouth facing away from the first body engagement mouth;
one of the first or second body comprising an engagement hook;
the spring assembly comprising a spring, having opposed first and second spring ends, the first spring end engaging the first body cavity floor, the second spring end engaging the second body column end surface wherein the spring assembly biases the first body engagement mouth away from the second body engagement mouth.

12. The assembly of claim 11 wherein the first and second wire engagement surfaces are smooth, curved surfaces.

13. The assembly of claim 12 wherein the first and second wire engagement surfaces are generally parabolic.

14. The assembly of claim 11 wherein the first body comprises a retention slot extending generally vertically between a body top and a body bottom and the second body comprises a retention flange said flange located in said retention slot.

15. The assembly of claim 11 wherein the first body cavity floor comprises a first body retention bore, said first spring end engaging said first body retention bore and the second body column end surface comprises a second body retention bore, said second spring end engaging said second body retention bore.

16. The assembly of claim 11 wherein the first body cavity floor slopes upward at an angle upward between a first body front and a first body rear and the column end surface slopes upward at an angle upward between a second body front and a second body rear.

17. The assembly of claim 11 wherein said body cavity oval-shaped cross-section and body column oval-shaped cross-section each have a major axis.

18. A support assembly for a wire shelf, the assembly comprising:
a first body having a body front, a body rear, a body top and a body bottom, the first body having a body cavity and an engagement mouth proximate the body bottom; the body cavity having a generally oval-shaped cross-section and extending from a cavity opening proximate the body top portion to a cavity floor away from the cavity opening, the engagement mouth having a first wire engagement surface, a mouth front edge and a mouth rear edge, said mouth front edge and mouth rear edge extending away from a mouth base, said rear edge proximate said body rear and said front edge proximate said body front, the first wire engagement surface extending between said front edge and rear edge;
a second body having a body front, a body rear, a body top and a body bottom, the second body having a body column extending from the body bottom toward the body top, the body column having a generally oval-shaped cross-section and a column end surface proximate the body bottom and an engagement mouth proximate the body top, the engagement mouth having a second wire engagement surface, a mouth front edge and a mouth rear edge, said mouth front edge and mouth rear edge extending away from a mouth base, said rear edge proximate said body rear and said front edge proximate said body front, the second wire engagement surface extending between said front edge and rear edge;
one of the first or second body comprising an engagement hook;

said first body engagement mouth facing away from said second body engagement mouth;

biasing means forcing the first body away from the second body;

sliding connection means joining the first body to the second body, said sliding connection means permitting the relative movement of the first and second body toward and away from each other to allow the assembly to be moved between an assembly non-compressed configuration wherein the first body is away from the second body and a compressed configuration wherein the first body is toward the second body.

19. The assembly of claim 18 wherein said biasing means comprise a spring assembly located between the first body and the second body, said spring assembly having opposed first and second spring ends, the first spring end engaging the first body proximate the cavity floor, the second spring end engaging the second body proximate the second body bottom.

20. The assembly of claim 19 wherein the first and second wire engagement surfaces are generally parabolic.

21. The assembly of claim 20 wherein the first body cavity floor slopes upward at an angle upward between the first body front and the first body rear and the body column comprises a column end surface that slopes upward at an angle upward between the second body front and the second body rear.

22. The assembly of claim 18 wherein said body cavity oval-shaped cross-section and body column oval-shaped cross-section each have a major axis.

23. A support assembly for a wire shelf, the support assembly comprising:

a first body having a body front, a body rear, a body top and a body bottom, the first body having a body cavity and an engagement mouth comprising a first wire engagement surface; the body cavity extending from a cavity opening to a cavity floor, the cavity floor sloping at an angle between the first body front and the first body rear;

a second body having a body front, a body rear, a body top and a body bottom, the second body having a body column, the body column having a column end surface, the column end surface sloping at an angle between the second body front and the second body rear and an engagement mouth comprising a second wire engagement surface;

one of the first or second body comprising an engagement hook;

said first body engagement mouth facing away from said second body engagement mouth; the second body column located within the first body cavity;

biasing means forcing the first body away from the second body wherein the assembly has a non-compressed configuration wherein the first body is away from the second body and a compressed configuration wherein the first body is toward the second body.

24. The assembly of claim 23 wherein said first body cavity floor slopes upward at an angle upward between the first body front and the first body rear and said column end surface slopes upward at an angle upward between the second body front and the second body rear.

25. The assembly of claim 24 wherein said body cavity and said body column each have generally oval-shaped cross-sections.

26. The assembly of claim 25 wherein said body cavity oval-shaped cross-section and body column oval-shaped cross-section each have a major axis.

27. The assembly of claim 23 wherein the first wire engagement surface and second wire engagement surface are smooth, curved surfaces.

28. The assembly of claim 27 wherein the first wire engagement surface and second wire engagement surface are generally parabolic.

29. The assembly of claim 23 wherein said biasing means comprise a spring assembly located between the first body and second body.

* * * * *